United States Patent [19]

Focke et al.

[11] 4,108,263
[45] Aug. 22, 1978

[54] METHOD AND APPARATUS HAVING A VIBRATION-FREE MEASURING PHASE FOR AUTOMATICALLY WEIGHING BULK MATERIAL, MORE PARTICULARLY TOBACCO

[75] Inventors: Heinz Focke; Oskar Balmer, both of Verden, Aller, Germany

[73] Assignee: Focke & Pfuhl, Verden, Germany

[21] Appl. No.: 695,693

[22] Filed: Jun. 14, 1976

[51] Int. Cl.² .................. G01G 19/00; G01G 23/02
[52] U.S. Cl. ................................ 177/145; 177/155
[58] Field of Search ............. 131/22 R, 22 A; 214/2; 177/155, 112–114, 146, 151–, 145, 184, 210 EM

[56] References Cited

U.S. PATENT DOCUMENTS 2,605,096  7/1952  Bradley .................... 177/145 X
3,137,358  6/1964  Jungmayr ............. 177/210 EM UX Primary Examiner—George H. Miller, Jr.
Attorney, Agent, or Firm—Sughrue, Rothwell, Mion, Zinn and Macpeak

[57] ABSTRACT

A method and apparatus for automatically weighing and separating specific individual quantities of a bulk material such as tobacco is disclosed. The weighing container is separated from the carrier and from the measuring system of a scale during the phase in the operating cycle during which no measuring is taking place so as to avoid operationally induced vibrations.

8 Claims, 3 Drawing Figures

METHOD AND APPARATUS HAVING A VIBRATION-FREE MEASURING PHASE FOR AUTOMATICALLY WEIGHING BULK MATERIAL, MORE PARTICULARLY TOBACCO

BACKGROUND OF THE INVENTION

1. Field of the Invention

This invention relates to a weighing unit for the cyclical and automatic weighing of bulk material, more particularly, tobacco, in which the charging and discharging operations occur practically without vibrating the sensitive measuring system of the scale.

2. Prior Art

Where cyclic weighing is carried out at a high speed, a problem arises of absorbing mechanical shocks in the system and the need of rendering them ineffective such that the weighing can be accomplished accurately and continuously. It is the purpose of this invention to isolate these vibrations (for example, the vibrations occurring upon the unloading of a weighing hopper having a flap or similar mechanism) and to prevent them from affecting the sensitive measuring component of a scale (for instance, an electro-dynamic scale). This is necessary in order to prevent premature wear and, therefore, weighing inaccuracies in the scale's measuring system.

Various ways of overcoming the problem have been attempted and form the prior art. For instance, it has been proposed that the complete weighing unit be resiliently suspended and damped, thus absorbing and, as well, reducing the loading and unloading shocks. Alternatively, it is also known to lock the weighing container during the loading and unloading phases in order to protect the measuring unit from shock. However, these arrangements afford only limited protection for the sensitive measuring parts of a scale.

SUMMARY OF THE INVENTION

It is the purpose of this invention to eliminate the defects in the arrangements described above by means of a new weighing and load-relieving system. Since the unit is rendered insensitive to shock, its output increases. The invention accomplishes this purpose by periodically separating, or temporarily completely disconnecting, the measuring component, on the one hand, from the weighing container, on the other hand.

The weighing unit according to the invention may comprise, firstly, a scale housing which is resiliently mounted and damped in a conventional manner. The housing contains all of the sensitive weighing elements of the scale, together with a carrier for a weighing container. The container, for example, a weighing hopper having a discharge flap, is an independent unit and is seated, during an operating cycle, alternately upon the carrier and upon a supporting frame. When the container is in the latter position, the weighed material is discharged by opening the discharge flap, thus producing a shock. If, however, the weighing container is disconnected, it is impossible for vibrations to be transferred to the measuring element of the scale.

BRIEF DESCRIPTION OF THE DRAWINGS

Preferred embodiments of the invention are explained in greater detail in association with the accompanying drawings wherein.

DESCRIPTION OF THE PREFERRED EMBODIMENT

Figure 1:
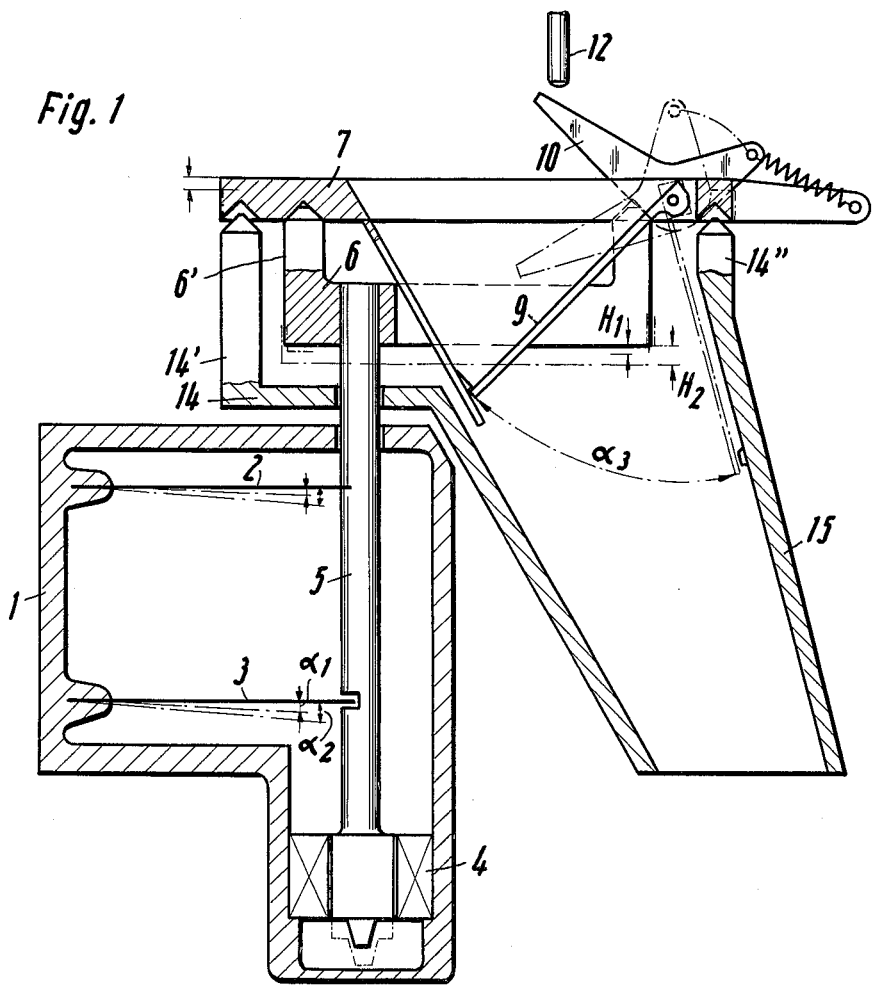
FIG. 1 shows a lateral section through the entire weighing unit, the unit being in the weighing position and having the discharge flap closed.

Referring now to FIG. 1, the weighing unit for the execution of the weighing technique according to the invention comprises mainly a scale housing 1 accommodating an electro-dynamic measuring system. The lower end of a weighing arm 5 is fitted with an armature (not shown) entering a measuring coil 4. The necessary vertical movements corresponding to a measuring stroke $H_1$ and a load-relieving stroke $H_2$ of the weighing arm 5 are rendered by means of two parallel links 2, 3, which are coupled to the housing 1 and the weighing arm 5. Strokes $H_1$, $H_2$ correspond to angular deflections L1 and L2 of the two links.

Figure 3:
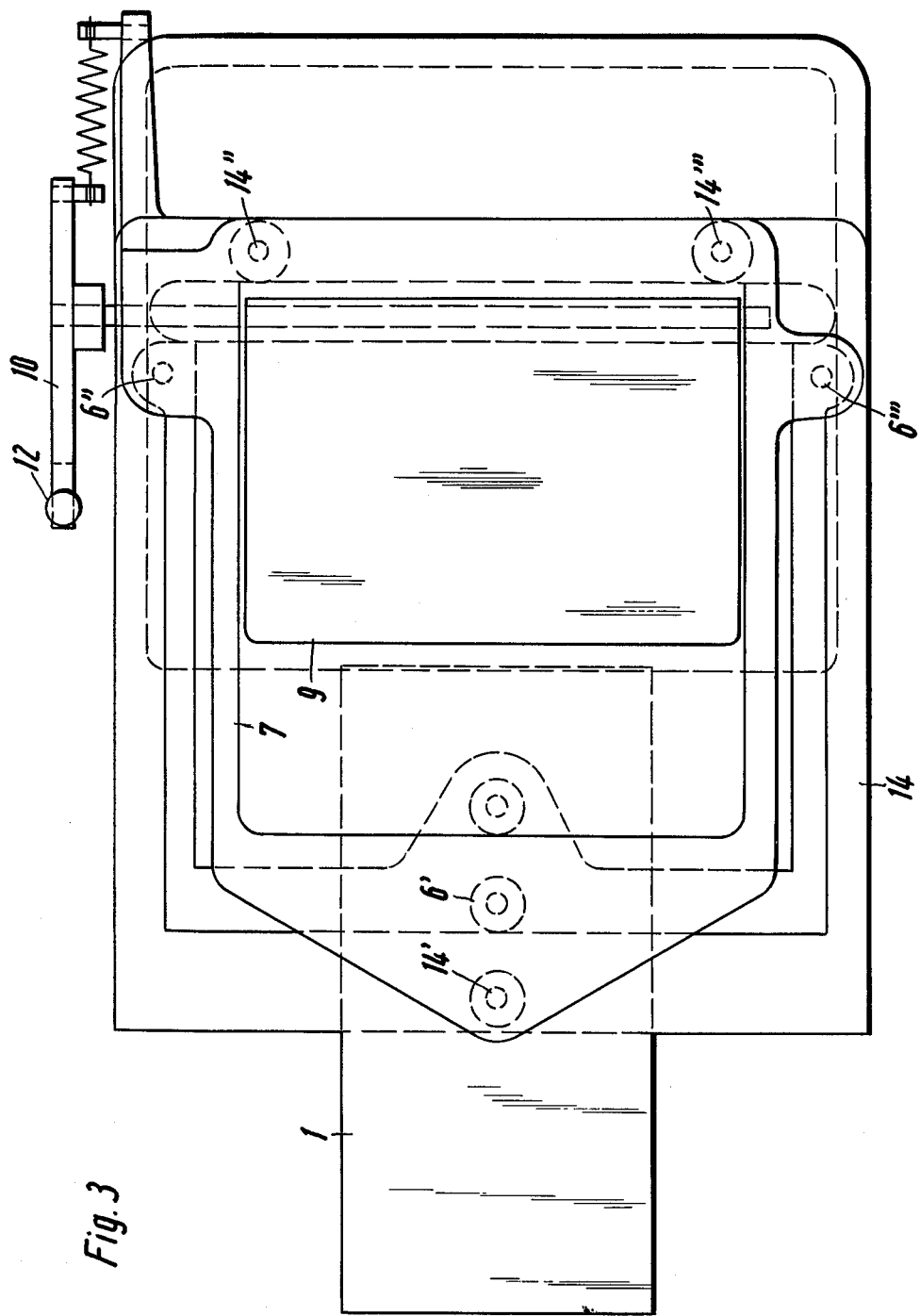
FIG. 3 is a plan view of the weighing hopper and its carrier, also showing the supporting frame with the chute and scale housing.

The weighing arm 5 is rigidly connected to a carrier 6. As shown in FIG. 3, carrier-support pins 6', 6'', 6''' are used to periodically support a weighing hopper 7 and a discharge flap 9, the latter being mounted in the weighing hopper and being pivotable through an angle L3. The weighed material is discharged by means of a tappet 12 and a spring-loaded lever 10 which is seated, with the flap 9, upon a common shaft.

A supporting frame 14, which is rigidly attached to a chute 15 (FIG. 1), also periodically supports the weighing hopper 7, the frame being coupled to the hopper by means of support pins 14', 14'', 14''' engaging in corresponding centering locations 7' in the weighing hopper.

The weighing unit for the execution of the weighing technique according to the invention operates as follows: Depending upon the filling method selected, the material to be weighed passes in one or more batches into the weighing hopper 7. Either at the same time or, at the latest, as soon as the hopper is full, the measuring system of the scale commences to operate. During this phase of the cycle, the weighing hopper rests upon the support pins 6', 6'', 6''' of the carrier 6, thereby transferring the filling weight of the measuring system to the scale. As soon as the weighing operation has been completed, the load change occurs.

Figure 2:
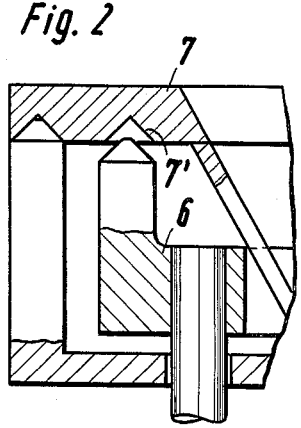
FIG. 2 is a partial section through the weighing hopper and the supporting frame in the disconnected position in which the weighing hopper is separated from the measuring element.

At this time, the weighing arm 5 and the carrier 6 carry out a downwardly directed load-relieving stroke $H_2$, which is brought about by switching off the magnetic field of the coil 4, the amount of the movement being limited by means of a stop not shown. During the downward movement, the weighing hopper 7 is set down upon support points 14', 14'', 14''' of the supporting frame 14, thus completing a setting-down stroke. Shortly thereafter, the carrier and weighing hopper are also separated from each other by lifting. This relieves the load on the measuring system of the scale, thus isolating the sensitive parts thereof from vibration. This operating position is shown in FIG. 2.

This phase is followed by the discharge of the weighed material by means of the flap 9, the flap being actuated by means of the lever 10 and the tappet 12. The weighed material may be rapidly discharged regardless of any vibrations, especially the vibration produced by the opening of the flap.

According to another embodiment of the invention, any other type of scale may be used, for instance one having a piezo-electric measuring system in which a downwardly directed set-down stroke of the carrier is excluded. In this case, there is a kinematic reversal of the load-relieving principle upon which the invention is based. In this modification of the weighing technique according to the invention, supporting frame 14, with pins 14', 14", 14''', is raised, instead of the carrier 6 being lowered. This arrangement also lifts the weighing hopper from the carrier, thus disconnecting it from the measuring portion of the scale.

The embodiments illustrated in the attached drawings may be modified in various ways. For instance, it is possible to use scales of various designs and weighing containers having different emptying mechanisms.

The embodiments of the invention in which an exclusive property or privilege is claimed are defined as follows:

1. In an apparatus for automatically weighing and separating specific individual quantities of a bulk material such as tobacco, said apparatus having a weighing container and a measuring system having a carrier, the improvement comprising: means for separating the weighing container from the carrier during a phase in operation of said apparatus when no measurement takes place, said means including a load frame coupled to said weighing container, a weighing arm coupled to said carrier, a measuring coil attached to said weighing arm and a fixed supporting frame, whereby when the force field of said measuring coil is inoperative, said arm and carrier are lowered thereby effecting a load change between the carrier and said fixed supporting frame to set the load frame upon the fixed supporting frame temporarily separating said weighing container from the carrier.

2. An apparatus according to claim 1, in which an alternating coupling between the carrier, the weighing container, and the fixed supporting frame is achieved by an arrangement of support pins and centering cones.

3. An apparatus according to claim 1 in which an emptying flap of the weighing container is mounted pivotably in the container, said flap adapted to be actuated from the outside by an actuating lever.

4. The apparatus of claim 1 wherein the carrier has three carrying pegs for the reception with the load frame.

5. The apparatus of claim 4 wherein three fixed catching points are disposed as supports for the load frame on the fixed supporting frame, said fixed supporting frame being firmly connected with a chute for the delivery of the weighed portions.

6. The apparatus of claim 5 wherein the load frame includes a weighing funnel with a discharge flap opening downwards.

7. The apparatus of claim 5 wherein said load frame has conical recesses, said recesses disposed for the entry of the bearing pegs on said carrier tapering correspondingly to a point.

8. The apparatus of claim 7 wherein said load frame has additional conical recesses disposed for catching points associated with said fixed supporting frame.

* * * * *